(12) United States Patent
Khoo et al.

(10) Patent No.: US 9,232,522 B2
(45) Date of Patent: Jan. 5, 2016

(54) FULL DUPLEX DIRECT MODE INDIVIDUAL AND GROUP CALLING USING ADJACENT TIME SLOTS IN A TDMA SYSTEM

(71) Applicant: MOTOROLA SOLUTIONS, INC, Schaumburg, IL (US)

(72) Inventors: Hun Weng Khoo, Gelugor (MY); Thomas B Bohn, Mc Henry, IL (US); Yueh Ching Chung, Georgetown (MY); David G Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 52 days.

(21) Appl. No.: 13/946,464

(22) Filed: Jul. 19, 2013

(65) Prior Publication Data

US 2015/0023227 A1    Jan. 22, 2015

(51) Int. Cl.
*H04J 3/00* (2006.01)
*H04W 72/04* (2009.01)
*H04L 5/14* (2006.01)
(Continued)

(52) U.S. Cl.
CPC ......... *H04W 72/0446* (2013.01); *H04B 7/2656* (2013.01); *H04L 5/14* (2013.01); *H04W 84/08* (2013.01)

(58) Field of Classification Search
CPC . H04Q 9/00; H04Q 2209/60; H04Q 2209/75; H04Q 2209/43; H04W 72/1242; H04W 84/18
USPC .............................. 370/272–297, 345; 455/73
See application file for complete search history.

(56) References Cited

U.S. PATENT DOCUMENTS

| D539,276 S | 5/1895 | Lewin |
|---|---|---|
| 4,677,656 A | 6/1987 | Burke et al. |
| 4,942,570 A | 7/1990 | Kotzin et al. |

(Continued)

FOREIGN PATENT DOCUMENTS

| EP | 292996 A2 | 11/1988 |
|---|---|---|
| EP | 778680 A1 | 6/1997 |

(Continued)

OTHER PUBLICATIONS

Motorola, TDMA Technology Bringing Increased Capacity and Functionality to Professional Digital Two Way Radio, 2012. (From Applicant's IDS filed on Jul. 19, 2013).*

(Continued)

*Primary Examiner* — Mang Yeung
(74) *Attorney, Agent, or Firm* — Barbara R. Doutre

(57) ABSTRACT

A method for enabling full duplex direct mode calls between radios in an N:1 slotting ratio TDMA radio system includes detecting a request for a full duplex direct mode call at a first radio, transmitting in a particular slot of a first recurring time slot of N recurring time slots on a first single frequency one of a call request and a call header identifying the call as a full duplex call. Subsequently transmitting, by the first radio, during a plurality of subsequent first recurring time slots, outbound voice and/or data transmissions. And receiving, during a plurality of second recurring time slots of the N recurring time slots, each second recurring timeslot positioned immediately adjacent a respective first recurring time slot in an interleaved manner, inbound voice and/or data transmissions from the second radio and playing back the inbound voice and/or data transmission at the first radio.

21 Claims, 7 Drawing Sheets

(51) Int. Cl.
H04B 7/26 (2006.01)
H04W 84/08 (2009.01)

(56) References Cited

U.S. PATENT DOCUMENTS

| | | | |
|---|---|---|---|
| 5,231,629 | A | 7/1993 | Kotzin et al. |
| 5,392,276 | A * | 2/1995 | Tran .............................. 370/294 |
| 5,442,681 | A | 8/1995 | Kotzin et al. |
| 5,539,730 | A * | 7/1996 | Dent .............................. 370/280 |
| 5,628,052 | A * | 5/1997 | DeSantis et al. ........... 455/562.1 |
| 5,790,527 | A | 8/1998 | Janky et al. |
| 5,883,884 | A | 3/1999 | Atkinson |
| 5,974,034 | A | 10/1999 | Chin et al. |
| 5,974,325 | A | 10/1999 | Kotzin et al. |
| 6,014,375 | A | 1/2000 | Janky |
| 6,240,077 | B1 | 5/2001 | Vuong et al. |
| 6,810,022 | B1 | 10/2004 | Young |
| 8,274,993 | B2 | 9/2012 | Sharma et al. |
| 2002/0071415 | A1 | 6/2002 | Soulabail et al. |
| 2002/0142767 | A1 | 10/2002 | Mears et al. |
| 2004/0228292 | A1 | 11/2004 | Edwards |
| 2005/0201317 | A1 | 9/2005 | Bohn et al. |
| 2007/0263570 | A1 | 11/2007 | Alapuranen et al. |
| 2009/0239515 | A1* | 9/2009 | Bai et al. ....................... 455/416 |
| 2010/0034123 | A1* | 2/2010 | Razdan et al. ................. 370/277 |
| 2010/0279726 | A1 | 11/2010 | Bohn et al. |
| 2010/0309823 | A1 | 12/2010 | Guha et al. |
| 2011/0122851 | A1 | 5/2011 | Gessner et al. |
| 2012/0201173 | A1 | 8/2012 | Jain et al. |
| 2012/0264369 | A1 | 10/2012 | Wang |
| 2014/0355508 | A1* | 12/2014 | Anchan et al. ................. 370/312 |

FOREIGN PATENT DOCUMENTS

| | | |
|---|---|---|
| EP | 1501322 A2 | 1/2005 |
| EP | 2048822 A1 | 4/2009 |
| EP | 2190254 A1 | 5/2010 |
| EP | 2119133 B1 | 10/2012 |
| EP | 1501322 B1 | 11/2012 |
| GB | 2362292 A | 11/2001 |
| GB | 2404307 A | 1/2005 |
| WO | 90/08435 A1 | 7/1990 |
| WO | 9519071 A1 | 7/1995 |
| WO | 9926362 A | 5/1999 |
| WO | 0018052 A1 | 3/2000 |
| WO | 0059138 A1 | 10/2000 |
| WO | 2010039597 A2 | 4/2010 |
| WO | 2012087926 A1 | 6/2012 |

OTHER PUBLICATIONS

ETSI; Electromagnetic Compatibility and Radio Spectrum Matters (ERM); Digital Mobile Radio (DMR) General System Design; May 2, 2008; 69 Pages.

Motorola Solutions, Inc.; TDMA Technology—Bringing Increased Capacity and Functionality to Professional Digital Two-Way Radio; White Paper; 2012; 12 Pages.

Corresponding International Application PCT/US2014/046632 International Search Report Dated Oct. 7, 2014.

PCT International Search Report Dated Oct. 23, 2014 for related application of PCT/US2014/046629.

"Electromagnetic Compatibility and Radio Spectrum Matters (ERM); Digital Mobile Radio (DMR) Systems", Part 1 DMR Air Interface (ai Protocol) Technical Report, (ETSI!), F-06921 Sophia-Antipolis; France, vol. ERM TGDMR, No. V2.3.1, Jul. 1, 2013.

* cited by examiner

FULL DUPLEX DIRECT MODE INDIVIDUAL AND GROUP CALLING USING ADJACENT TIME SLOTS IN A TDMA SYSTEM

BACKGROUND OF THE INVENTION

The European Telecommunications Standard Institute—Digital Mobile Radio (ETSI-DMR) is a direct digital replacement for analog Private Mobile Radio (PMR). DMR is a scalable system that can be used in unlicensed mode (in a 446.1 to 446.2 MHz band), and in licensed mode, subject to national frequency planning. Any of the ETSI standards or specifications referred to herein may be obtained by contacting ETSI at ETSI Secretariat, 650, route des Lucioles, 06921 Sophia-Antipolis Cedex, FRANCE.

DMR promises improved range, higher data rates, more efficient use of spectrum, and improved battery. Features supported include fast call set-up, calls to groups and individuals, short data and packet data calls. Supported communications modes include individual calls and group calls provided via a direct communication mode among the radios operating within the network. Other important DMR functions such as emergency calls, priority calls, short data messages and Internet Protocol (IP)-packet data transmissions are also supported.

Direct mode, more generally, is a mode of operation where radios may communicate within a network without the assistance of one or more infrastructure equipment (e.g., base stations or repeaters). A radio, as used herein, can be mobile and/or fixed end equipment that is used to obtain direct mode communications services. Direct mode can provide a more efficient and less costly communication system operation than repeater mode operation.

The ETSI-DMR standard provides for 12.5 Kilohertz (KHz) operation in direct mode. The 12.5 KHz operation refers to 12.5 KHz spectral efficiency in which there are two communication paths per 12.5 KHz of radio frequency (RF) spectrum. The 12.5 direct mode utilizes 27.5 millisecond (msec) pulsed (every 60 msec) radio transmissions on each of the logical channels. In the 12.5 direct mode of operation, radios transmit asynchronously and radios within range of the transmission synchronize themselves to that transmission for the purposes of receiving the transmission, but any transmissions in response to the first transmission are transmitted asynchronously.

Other direct mode protocols, perhaps consistent with the Project 25 (P25) standard defined by the Association of Public Safety Communications Officials International (APCO) and standardized under the Telecommunications Industry Association (TIA), or with the terrestrial trunked radio (TETRA) standard also defined by the ETSI, may operate in a similar manner and may be used in addition to or in place of the DMR protocol. Communications in accordance with any one or more of these direct mode communication standards, or other standards, may take place over physical channels in accordance with a TDMA (time division multiple access) protocol, perhaps in combination with an FDMA (frequency divisional multiple access) or CDMA (code division multiple access) protocol.

In half duplex TDMA direct mode communications systems, voice and/or data moves in only one direction at a time (source to target(s)), as compared to full duplex, in which voice and/or data can move in both directions (e.g., source to target(s) and target(s) to source). For example, the ETSI-DMR 6.25e standard implements an N:1 slotting ratio, where N=2, such that two half duplex TDMA direct mode calls can occur substantially simultaneously on a single respective direct mode frequency.

Prior efforts to implement full duplex calls in a TDMA direct mode communications system conventionally provided a second separate frequency on which to provide a return audio and/or data path from the target to the source that is time-aligned with the forward path. However, given the short guard intervals (~2.5 ms) between time slots in accordance with the ETSI-DMR 6.25e standard, a typical radio cannot switch between a first direct mode frequency to transmit on a first time slot (TS1) and a second direct mode frequency to receive on a second time slot (TS2) within the guard time interval provided under the standard. While the incorporation of a second synthesizer in the radio could alleviate some of the difficulty, the addition of a second independent synthesizer substantially increases costs to manufacture a radio, and is thus a less than optional solution.

Accordingly, what is needed is an improved method, system, and device for providing full duplex voice and/or data communications services in a direct mode N:1 TDMA communications systems that does not require each radio to switch its synthesizer between a transmit frequency and a different receive frequency, and vice versa, within an amount of time between immediately adjacent slots in the direct mode N:1 TDMA protocol.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
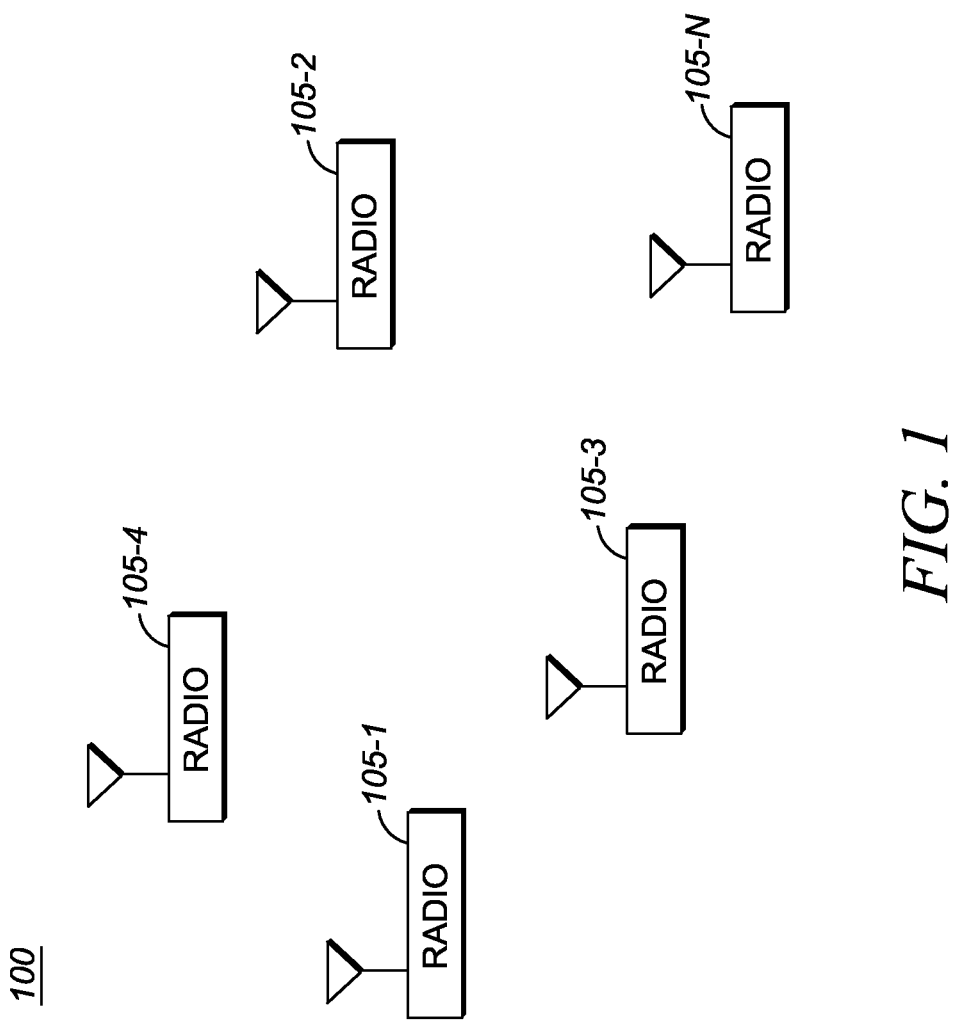
FIG. 1 is a block diagram of a direct mode wireless communications system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An improved method, system, and device for providing full duplex voice and/or data communications services in N:1 TDMA direct mode communications systems is disclosed that does not require each radio to switch its synthesizer between a transmit frequency and a different receive frequency, and vice versa, within an amount of time between adjacent slots in the N:1 TDMA direct mode protocol.

In accordance with a first embodiment, a method for enabling full duplex direct mode calls between radios in an N:1 slotting ratio TDMA radio system includes detecting, at a first radio, a request for a full duplex direct mode call from the first radio to at least a second radio, wirelessly transmitting, in a particular slot of a first recurring time slot of N recurring time slots on a first single frequency, one of a call request and a call header identifying the call as a full duplex call, wirelessly transmitting, by the first radio, during a plurality of subsequent first recurring time slots, outbound voice and/or data transmissions, and wirelessly receiving, at the first radio, during a plurality of second recurring time slots of the N recurring time slots, each second recurring timeslot positioned immediately adjacent a respective first recurring time slot in an interleaved manner, inbound voice and/or data transmissions from the second radio and playing back the inbound voice and/or data transmission at the first radio.

In accordance with a second embodiment, a radio capable of communicating in a full duplex direct mode between one or more other radios in an N:1 slotting ratio TDMA radio system includes: a transceiver, a memory, and a processor configured to: detect a request for a full duplex direct mode call to at least a second radio, wirelessly transmit, via the transceiver, in a particular slot of a first recurring time slot of N recurring time slots on a first single frequency, one of a call request and a call header identifying the call as a full duplex call, wirelessly transmit, via the transceiver, during a plurality of subsequent first recurring time slots, outbound voice and/or data transmissions, wirelessly receive, via the transceiver, during a plurality of second recurring time slots of the N recurring time slots, each second recurring timeslot positioned immediately adjacent a respective first recurring time slot in an interleaved manner, inbound voice and/or data transmissions from the second radio, and play back the inbound voice and/or data transmission.

Each of the above-mentioned embodiments will be discussed in more detail below, starting with example system and device architectures of the system in which the embodiments may be practiced, followed by a discussion of full duplex individual and group call setup and transmission from a system perspective and from an initiating radio's perspective. Further advantages and features consistent with this disclosure will be set forth in the following detailed description, with reference to the figures.

I. SYSTEM AND DEVICE ARCHITECTURES

Referring now to FIG. 1, an example of a digital direct mode wireless communications system 100 comprising a plurality of radios 105 operating in accordance with an embodiment is illustrated. Radios 105-1 through 105-5 communicate with each other on direct mode radio frequencies without communicating through any infrastructure including, for example, a repeater or base station. It will be appreciated by those of ordinary skill in the art that in some embodiments the frequency could also have repeaters on it, but radios 105 may not use those repeaters (e.g., the repeaters could belong to a different system, or the radios are operating in a talk-around mode).

A radio, as used herein, can be mobile and/or fixed end equipment that is used to obtain direct mode wireless communications services. For example, a radio can be a mobile radio (i.e. a portable radio, a mobile station, a subscriber unit, a mobile subscriber), or can be a fixed station (i.e. a fixed control station, a base station, and any supporting equipment such as wireline consoles and packet data switches). Each radio is capable of communicating directly with one or more other radios using techniques as further described herein, such as TDMA, in which specified time segments are divided into assigned interleaved recurring time slots for individual communications and each radio frequency (RF) in the system carries time slots, whereby each recurring time slot is known as a "channel."

For ease of describing the embodiments hereinafter, the digital direct mode wireless communications system 100 is presumed to be a two-time slot TDMA communications system in accordance with the ETSI-DMR standard. Thus, in the embodiments described below, since there are two interleaved recurring time slots, there are two channels available on each radio frequency for carrying the traffic of the system. For example, in one embodiment consistent with the ETSI-DMR standard for repeater-based communications, a time slot has a length of thirty milliseconds (30 ms) and is numbered "1" or "2" in accordance with its assignment to channel 1 or channel 2 and each aligned in an interleaved manner on a single frequency. It is important to note, however, that the TDMA communication system may have other slot lengths and slotting ratios, as well.

Figure 2:
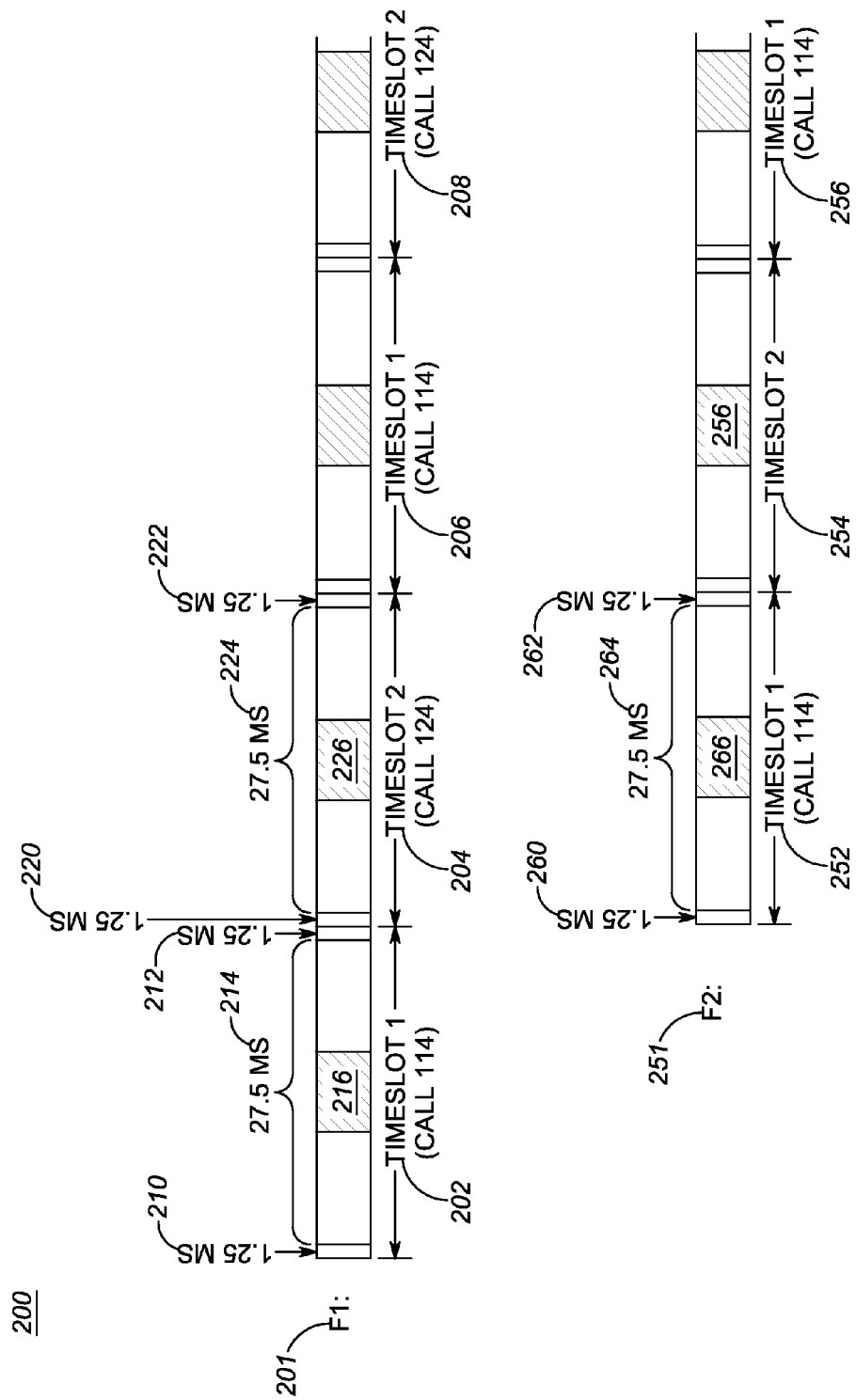
FIG. 2 is a timing diagram illustrating an example conventional full duplex TDMA direct mode call conducted over two different time-aligned frequencies.

As discussed above, and illustrated further in the transmission diagram 200 of FIG. 2, within the present ETSI-DMR direct mode systems, in the 12.5 KHz direct mode of operation, radios transmit asynchronously (because there is no common time slot reference available) and radios within range of the transmission synchronize themselves to that transmission for the purposes of receiving the transmission, but any new subsequent transmissions in response to the first transmission are transmitted asynchronously.

In a first half duplex mode illustrated via the top half of FIG. 2, radios 105-1-105-5 may directly communicate over a single shared RF frequency F1 201 in accordance with the ETSI-DMR standard. For example, in digital half duplex direct mode, radio 105-1 may initiate a new half duplex direct mode individual call 114 to radio 105-2 in a first timeslot 1 (TS1) slot 202 on F1 201, as illustrated in the timing diagram 200 of FIG. 2. TS1 slot 202 includes 1.25 ms guard intervals 210, 212 and a 27.5 ms payload period 214 that includes a sync slot 216. At substantially the same time that radio 105-1 initiates its new call, radio 105-5 may similarly initiate a new digital half duplex direct mode call 124 to radio 105-4 in a first timeslot 2 (TS2) slot 204, as illustrated in the timing diagram 200 of FIG. 2. TS2 slot 2 204 includes 1.25 ms guard intervals 220, 222 and a 27.5 ms payload period 224 that includes a sync slot 226. Half duplex calls 114 and 124 could then continue simultaneously in subsequent recurring time slots TS1 slot 206 and TS2 slot 208.

In an attempt to provide full duplex direct mode capabilities, another different frequency F2 251 may be assigned so that, in a full duplex mode, radios 105-1 and 105-2 could communicate with one another and not wait for one party to stop transmitting before the other party starts transmitting a response, as is required in the half duplex mode. For example, in digital full duplex direct mode, radio 105-1 may initiate the new direct mode individual call 114 to radio 105-2 in the first TS1 slot 202 on F1 201, as illustrated in the timing diagram 200 of FIG. 2. At a same time, a second channel may be allocated on the second frequency F2 251 for return audio and/or data. In the example illustrated in FIG. 2, TS1 slot 252 may be allocated on F2 251 for return traffic from radio 105-2 to radio 105-1. TS1 252 includes 1.25 ms guard intervals 260, 262 and a 27.5 ms payload period 264 that includes a sync slot 266. The full duplex call 114 could then continue in subsequent recurring time slots, TS1 slots 206 and 256 on F1 201 and F2 251, respectively. In this example, call 124 remains in a half duplex mode (using only F1 201) and TS2 slot 254 remains unused on F2 251. As shown in this example, however, the radio 105-1 would have to switch from F1 201 after transmitting during payload period 214 to F2 251 to receive during payload period 264 within the guard band periods 212 and 260 (2.5 ms total). In order to compensate for the insufficient switching time, the radios 105-1 and 105-2 may be provided with two separate synthesizers that can be separately tuned to each frequency F1 201 and F2 251. However, and as discussed earlier, such a solution substantially increases the cost to manufacture the radios 105-1 and 105-2.

Figure 3:
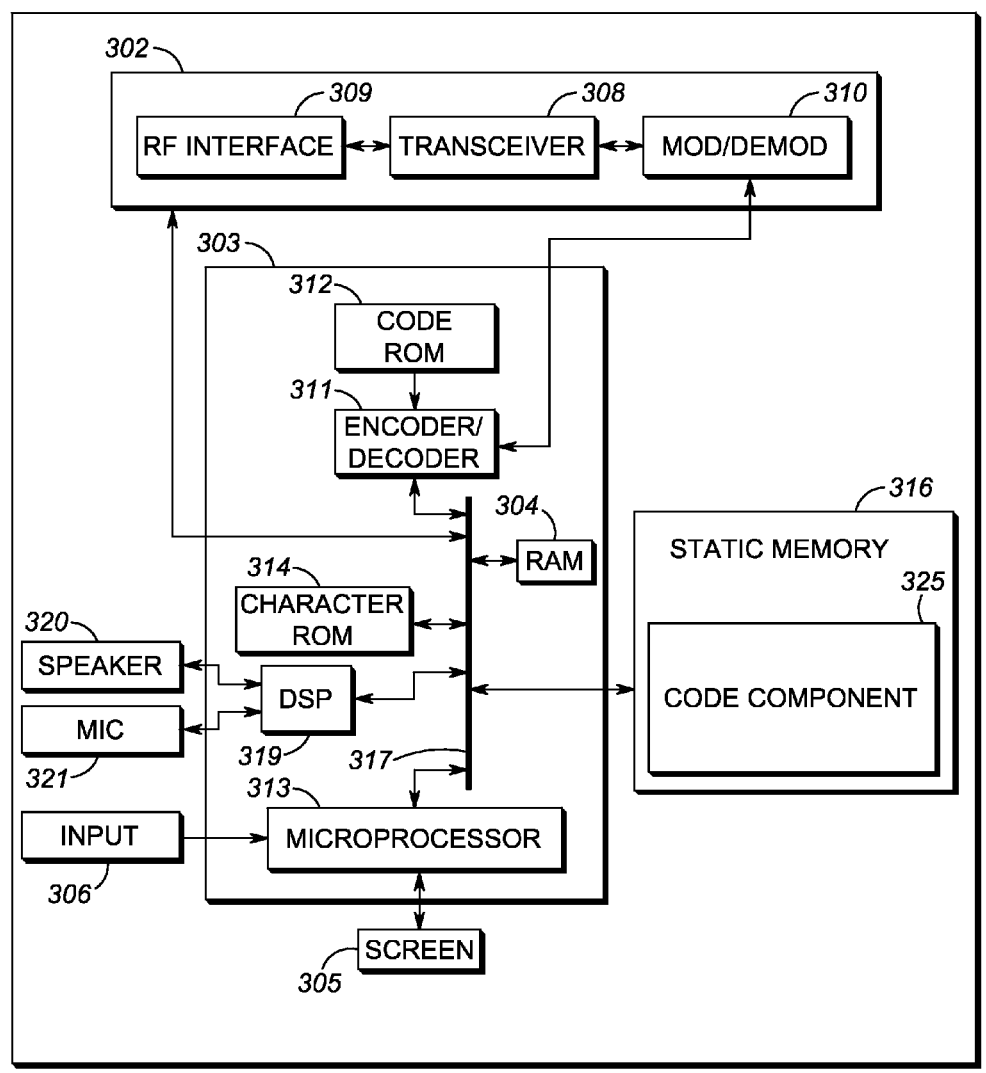
FIG. 3 is a block diagram illustrating a full duplex capable direct mode radio in accordance with an embodiment.

FIG. 3 is an example functional block diagram of an improved full duplex capable direct mode radio 300 that may operate within the digital direct mode wireless communications system 100 of FIG. 1 and provides an improved and more cost efficient digital full duplex direct mode capability in accordance with an embodiment. As shown in FIG. 3, radio 300 includes a communications unit 302 coupled to a common data and address bus 317 of a processing unit 303. The radio 300 may also include an input unit (e.g., keypad, pointing device, etc.) 306, an output transducer unit (e.g., speaker) 320, an input transducer unit (e.g., a microphone) 321, and a display screen 305, each coupled to be in communication with the processing unit 303.

The processing unit 303 may include an encoder/decoder 311 with an associated code Read Only Memory (ROM) 312 for storing data for encoding and decoding voice, data, control, and/or other signals that may be transmitted or received between other radios within direct mode communication range of radio 300. The processing unit 303 may further include a microprocessor 313 coupled, by the common data and address bus 317, to the encoder/decoder 311, a character ROM 314, a Random Access Memory (RAM) 304, and a static memory 316. The processing unit 303 may also include a digital signal processor (DSP) 319, coupled to the speaker 320, the microphone 321, and the common data and address bus 317, for operating on audio signals received from one or more of the communications unit 302, the static memory 316, and the microphone 321.

The communications unit 302 may include an RF interface 309 configurable to communicate directly with other half duplex and full duplex digital direct mode radios. The communications unit 302 may include one or more wireless transceivers 308, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311. In one embodiment, the communication unit 302 may contain a single direct conversion transceiver that does not require synthesizer reprogramming when switching between a receive mode and a transmit mode on a same single frequency, or may contain a VLIF transceiver where synthesizer reprogramming is needed but can be completed within the allotted 2.5 ms time period under the ETSI-DMR standard.

The microprocessor 313 has ports for coupling to the input unit 306 and to the display screen 305. The character ROM 314 stores code for decoding and/or encoding data such as control messages and/or data or voice messages that may be transmitted or received by the radio 300. Static memory 316 may store operating code component 325 for the microprocessor 313 that, when executed, [claim 1], in accordance with one or more of FIGS. 4-6 and corresponding text. Static memory 316 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

II. THE PROCESS OF INITIATING AND TRANSMITTING A FULL DUPLEX DIRECT MODE INDIVIDUAL OR GROUP CALL

Figure 4:
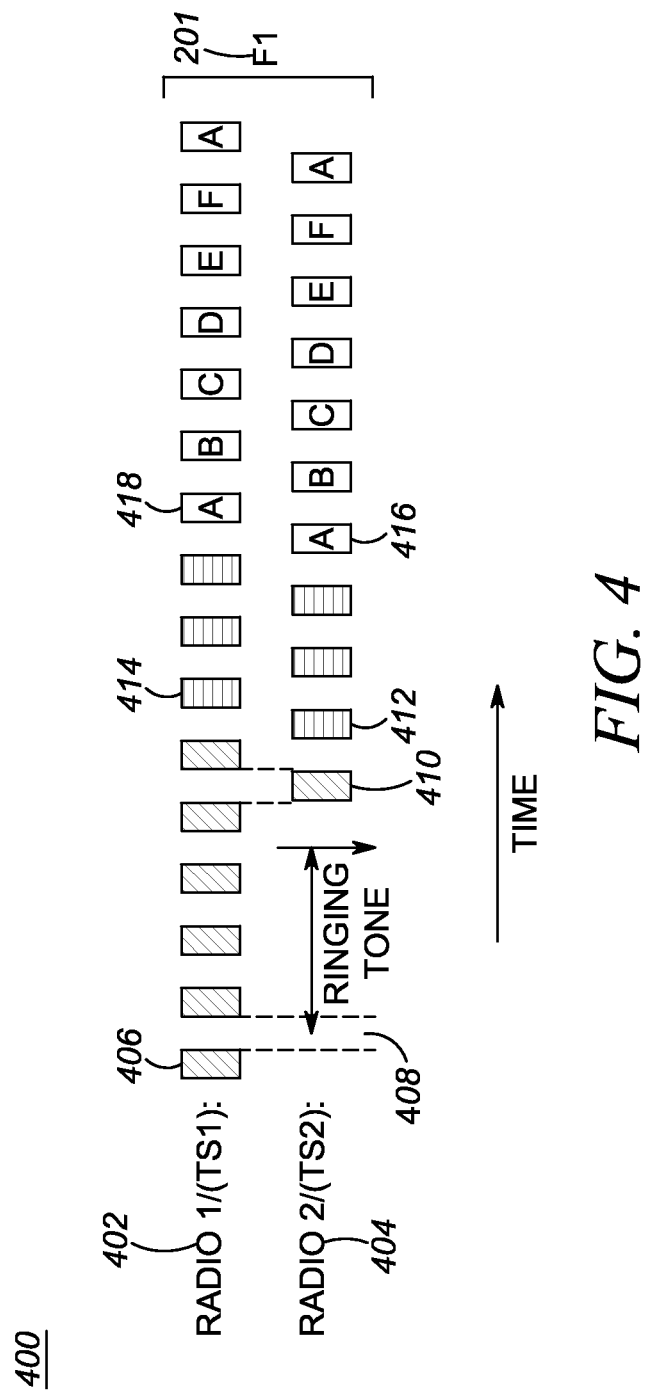
FIG. 4 is a timing diagram illustrating a full duplex direct mode individual call setup and transmission in an example direct mode radio system in accordance with an embodiment.
Figure 5:
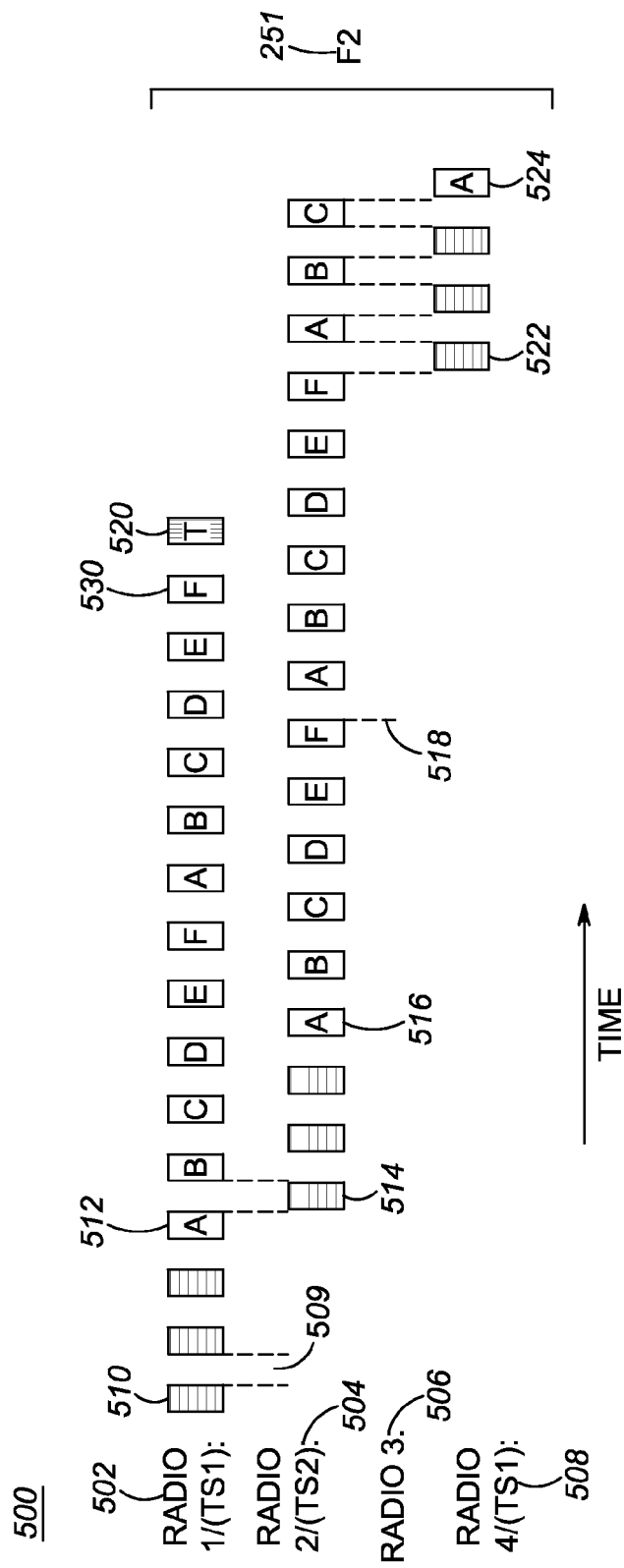
FIG. 5 is a timing diagram illustrating a full duplex direct mode group call setup and transmission in an example direct mode radio system in accordance with an embodiment.

FIGS. 4-6 set forth example individual and group call timing diagrams and process flows of a full duplex direct mode call setup and transmission process that may be executed at source and target radios in accordance with some embodiments. In the examples set forth in detail below, only particular sequences are disclosed with respect to the source and target radios. Of course, additional steps or message transmissions not disclosed herein could be additionally added before, after, or in-between steps or message transmissions or receptions disclosed in FIGS. 4-6, and the presence of such additional steps or message transmissions or receptions would not negate the purpose and advantages of the full duplex direct mode call setup and transmission examples set forth in detail throughout the remainder of this disclosure.

FIG. 4 sets forth a timing diagram 400 illustrating an example timing of a full duplex direct mode individual call setup and transmission in accordance with an embodiment. For ease of describing the embodiments hereinafter, the digital wireless communications system in which message transmissions and processing steps are illustrated in FIG. 4 (and FIGS. 5 and 6 for that matter) is presumed to be a two time slot (2:1) TDMA direct mode radio communications system in accordance with the ETSI-DMR 6.25e standard. Thus, in the embodiments described below, since there are two time slots, there are two channels available on each radio frequency for carrying control or traffic payloads in the system, and only two parties to a full duplex call may be "active" (e.g., transmitting) at any one time. For example, in one embodiment consistent with the ETSI-DMR standard for direct mode communications, time slots in FIGS. 4 and 5 may adopt the same or similar time slot structure as set forth in FIG. 2. Of course, in other embodiments, different slotting ratios, different slot lengths, and different slot numbering conventions could be used. Increased slotting ratios may provide a commensurate increase in the number of potentially active full duplex participants. For example, a 3:1 slotting ratio may allow three active full duplex participants, with any number of additional monitor/listen only participants able to participate in the call in an "inactive" mode. In this example, each third recurring timeslot would be positioned immediately adjacent the second recurring time slot and the first recurring timeslot (e.g., in between the second recurring time slot and the next first recurring time slot) in an interleaved manner. Each active radio would thus need to combine and simultaneously play back first and second inbound voice and/or data transmissions, while each inactive radio would need to combine and simultaneously play back first, second, and third inbound voice and/or data transmissions. Other examples are possible as well.

In contrast to FIG. 2, and as set forth in FIG. 4, the two radios (radio 1 402 and radio 2 404 in this example) party to the full duplex direct mode individual call are each assigned immediately adjacent time slots on a single frequency F1 201. The single frequency F1 201 that previously supported two simultaneous half duplex calls is thus converted to support a single full duplex call. The top row of time slots illustrated in FIG. 4 and on which radio 1 402 transmits are all TS1 slots (e.g., channel 1), while the bottom row of time slots illustrated in FIG. 4 and on which radio 2 404 transmits are all TS2 slots (e.g., channel 2).

In order to support a half duplex TDMA channel to be converted, at least temporarily, to a full duplex TDMA channel, the call request transmitted by radio 1 402 in the first time slot 1 406 needs to indicate that it is a full duplex call request. In addition, other radios operating within transmission range of radio 1 402 need to be configured to recognize the full duplex call request and refrain from initiating calls or otherwise transmitting in either channel 1 or channel 2 on F1 201. For example, the full duplex indicator may be a particular bit setting in a particular designated full duplex direct mode call request field of a control signaling block (CSBK) message, or may be a new opcode that may be populated in the existing opcode field of the CSBK. Other possibilities exist as well. The call request may additionally explicitly identify the first and second immediately adjacent recurring time slots assigned for the call via one or more bit settings within the call request. In other embodiments, the call request may not explicitly identify the assigned time slots, but instead implicitly identify the first and second immediately adjacent time slots based solely on the request's transmission in the first recurring time slot (e.g., identifying the time slot it was transmitted in for the request transmitting radio, radio 1 402, to transmit and the immediately following time slot for the request receiving radio, radio 2 404, to transmit).

As shown in FIG. 4, a first TS2 slot 408 and subsequent TS2 slots remain empty until radio 2 404 accepts the call. Radio 1 402 continues to broadcast the call request in subsequent recurring TS1 slots in order to continue to reserve the immediately adjacent TS1 and TS2 slots (in this case, all of the time slots available on frequency F1 201 due to the 2:1 slotting radio) and to prevent late arriving radios from keying up and using one or both of the TS1 and TS2 slots.

Once radio 2 404 receives and processes the call request transmitted in the first TS1 slot 406 or subsequent TS1 slots, it may generate a ringing tone, visual display, or some other indicator so as to indicate to a user at radio 2 404 that radio 1 402 has requested a full duplex individual direct mode call. Assuming that the radio 2 404 user decides to accept the call, or in some embodiments the radio 2 404 automatically accepts the call, radio 2 404 transmits an answer response in TS2 slot 410. Subsequently, radio 2 404 transmits a call header (e.g., a voice header or data header) in TS2 slot 412 and radio 1 402 transmits a call header in TS1 slot 414. One or more additional call headers may be transmitted by radio 2 404 in subsequent TS2 slots for data integrity reasons (e.g., a same header transmitted multiple times to ensure that it is received by receiving radios that potentially may have been in a battery saving mode) or in order to convey additional control or signaling information (e.g., encryption information, etc.). Finally, once the full duplex call setup is complete, radio 2 404 begins transmitting call payload (voice, audio, video, data, etc.) in bursts A-F starting with burst A in TS2 slot 416. Similarly, radio 1 402 begins transmitting call payload in bursts A-F starting with burst A in TS1 slot 418. The full duplex call may then continue until a termination condition occurs. Potential termination conditions include an explicit transmission of a call termination request in one of a TS1 and TS2 slot, passage of a threshold period of time without a transmission from one or both of radio 1 402 and radio 2 404, receipt of a transmit interrupt message in either a TS1 or TS2 slot, or upon occurrence of some other event. After termination, the frequency F1 201 may revert back to a default half duplex frequency supporting two separate half duplex calls until another full duplex call request is transmitted.

FIG. 5 sets forth a timing diagram 500 illustrating an example timing of a full duplex direct mode group call setup and transmission in a direct mode radio system in accordance with an embodiment. FIG. 5 is assumed to inherit the same slot structures and protocols as described with respect to FIG. 4. Accordingly, only the differences between FIGS. 4 and 5 will be described with respect to FIG. 5. Further, for ease of illustration, an example talkgroup includes four subscriber member radios, including radio 1 502, radio 2 504, radio 3 506, and radio 4 508. Each of the radios 502-508 are either pre-configured (perhaps via codeplug), configured via a local interface (such as input 306 and screen 305 of a radio 300), or configured via over the air instruction, to subscribe to the talkgroup and are provided with an identifier that uniquely identifies the talkgroup.

In contrast to the full duplex direct mode individual call described with respect to FIG. 4, the full duplex direct mode group call begins with the originating/source radio (radio 1 502) initially transmitting, in a first TS1 slot 510, a full duplex direct mode group call header (e.g., a voice header or data header). In order to support allowing a half duplex TDMA channel to be converted, at least temporarily, to a full duplex TDMA channel, the group call header transmitted by radio 1 502 in the first TS1 slot 510 needs to indicate that it is a full duplex call request, and other radios operating within transmission range of radio 1 510 (in this case, radios 2-4 504-508) need to be configured to recognize the full duplex direct mode call request and refrain from initiating calls or otherwise transmitting in both channel 1 (recurring TS1) and channel 2 (recurring TS2) on F2 251. For example, the indicator may be a particular bit setting in a particular designated full duplex direct mode group call request field of a modified ETSI-DMR 6.25e voice header, or may be a separate opcode populated in the existing opcode field of the voice header. Other possibilities exist as well. The call header may additionally explicitly identify the first and second immediately adjacent recurring time slots (interleaved channels) assigned for the call via one or more bit settings within the call request. In other embodiments, the call header may not explicitly identify the assigned slots, but instead implicitly identify the first and second immediately adjacent recurring time slots based solely on the call header's transmission on the first recurring time slot (e.g., identifying the time slot it was transmitted in for use by the call header transmitting radio, radio 1 502, and the immediate next time slot for use by responding member radios such as one of radios 2-4 504-508). The call header also includes the identifier associated with the talkgroup, so receiving radios can determine whether to join the talkgroup and unmute to reproduce received transmitted audio, video, or data associated with the talkgroup.

As shown in FIG. 5, the first TS2 slot 509 and several subsequent second time slots remain empty until another radio in the talkgroup determines to become active and transmit to the talkgroup. Radios not participating in the full duplex direct mode group call receive and decode the call header transmitted in the first TS1 slot 510 (and/or subsequent TS1 slots) and refrain from using both TS1 and TS2 slots. Link control messages embedded in subsequent payload frames (starting with voice and/or data frame A in TS1 slot 512) can also include information identifying the call as a full duplex call, which may be used by late arriving radios to again decode the information and refrain from using both TS1 and TS2 slots assigned to the full duplex direct mode group call.

Radio 1 502 begins transmitting call data in bursts A-F starting with burst A in TS1 slot 512. Radio 1 502 will continue to be the only radio transmitting across TS1 and TS2 slots assigned to the call (although radio 1 only transmits in TS1) until another radio in the talkgroup decides to become active and participate in the group call via TS2 slots. For example, a radio 2 504 user may decide to start talking back to the talkgroup and presses a push to talk (PTT) button on radio 2 504 at a same time that radio 1 502 is broadcasting voice and/or data traffic A in TS1 slot 512. Responsively, radio 2 504 transmits a call header in TS2 slot 514 and subsequently begins transmitting call data (voice, audio, video, data, etc.) in bursts A-F starting with burst A in TS2 slot 516.

The full duplex direct mode group call may then continue, with radios radio 1 502 and radio 2 504 as the only active members of the talkgroup (while the remaining radios 3 506 and 4 508 remain in a listen only mode) until a termination condition occurs. Possible termination conditions include an explicit transmission of a call termination request in one of TS1 and TS2 slots, explicit transmission of an active status termination message in one of time slots 1 and 2, passage of a threshold period of time without a transmission from any participating radio in the talkgroup, receipt of a transmit interrupt message in either a TS1 slot and a TS2 slot, or upon occurrence of some other event.

If the termination event terminates the entire full duplex call (e.g., a call termination request or full call interrupt), the call may end and frequency F2 251 may revert back to a default half duplex frequency supporting two half duplex calls until another full duplex call request is transmitted.

If the termination event terminates only one radio's active status in the full duplex call (e.g., an active status termination message or single radio interrupt), another radio in the talkgroup may then transition to active status and begin participating in the full duplex direct mode group call.

For example, and as shown in FIG. 5, a radio 3 506 user may attempt to become active and transmit to the talkgroup during the group call at time 518. However, the radio 3 506 will conduct a carrier check on TS1 and TS2 slots prior to transmitting a voice header (or may continuously keep track of radio 1's 502 and radio 2's 504 current usage of TS1 and TS2 slots without seeing an intervening termination message) and will refrain from keying up on either timeslot and perhaps display a failure message or playback a failure audio indicator to indicate that there are no currently available timeslots to transmit to the talkgroup on. Accordingly, in contrast to a conventional full duplex group call in which all group members can simultaneously transmit and hear all other transmitting members, disclosed is a full duplex'ish' group call in which the number of simultaneously transmitting members is limited by the number of immediately adjacent time slots available on a frequency (e.g., maxing out at the slotting ratio of the TDMA protocol). In those situations where the number of available immediately adjacent timeslots is equal to or greater than the number of members in a talkgroup, then a true full duplex group call may be conducted using the disclosed process. In those situations where the number of available immediately adjacent timeslots is less than the number of members in a talkgroup, then a more limited full duplex'ish' group call may be conducted in which only N number of talkgroup members may simultaneously transmit and be heard by all other members (where N is the slotting ratio and/or number of immediately adjacent time slots available on a frequency).

Referring to FIG. 5, radio 1 502 may subsequently transmit a termination message in TS1 slot 520 actively terminating its participation in the full duplex direct mode group call. Because another radio (radio 2 504) is still transmitting to the talkgroup, a call hangtime timer does not begin to run in this case, and the group call continues until some other termination condition arises. However, because one of the timeslots is now free (TS1 in this case), another member of the talkgroup can now transition from non-active status to an active status. For example, and as illustrated in FIG. 5, radio 4 508 may detect a request to transmit to the talkgroup (perhaps via a detected activation of its PTT button by a user) and transition to an active status. Subsequently, at TS1 slot 522, radio 4 508 transmits a call header on F2 251 and subsequently begins transmitting voice and/or data at TS1 slot 524. Once both radio 2 504 and radio 4 508 stop transmitting on F2 251, a full duplex call hangtime timer would begin, and the call would end and frequency F2 251 may revert to a half duplex channel after expiration of the full duplex call hangtime timer.

Figure 6A:
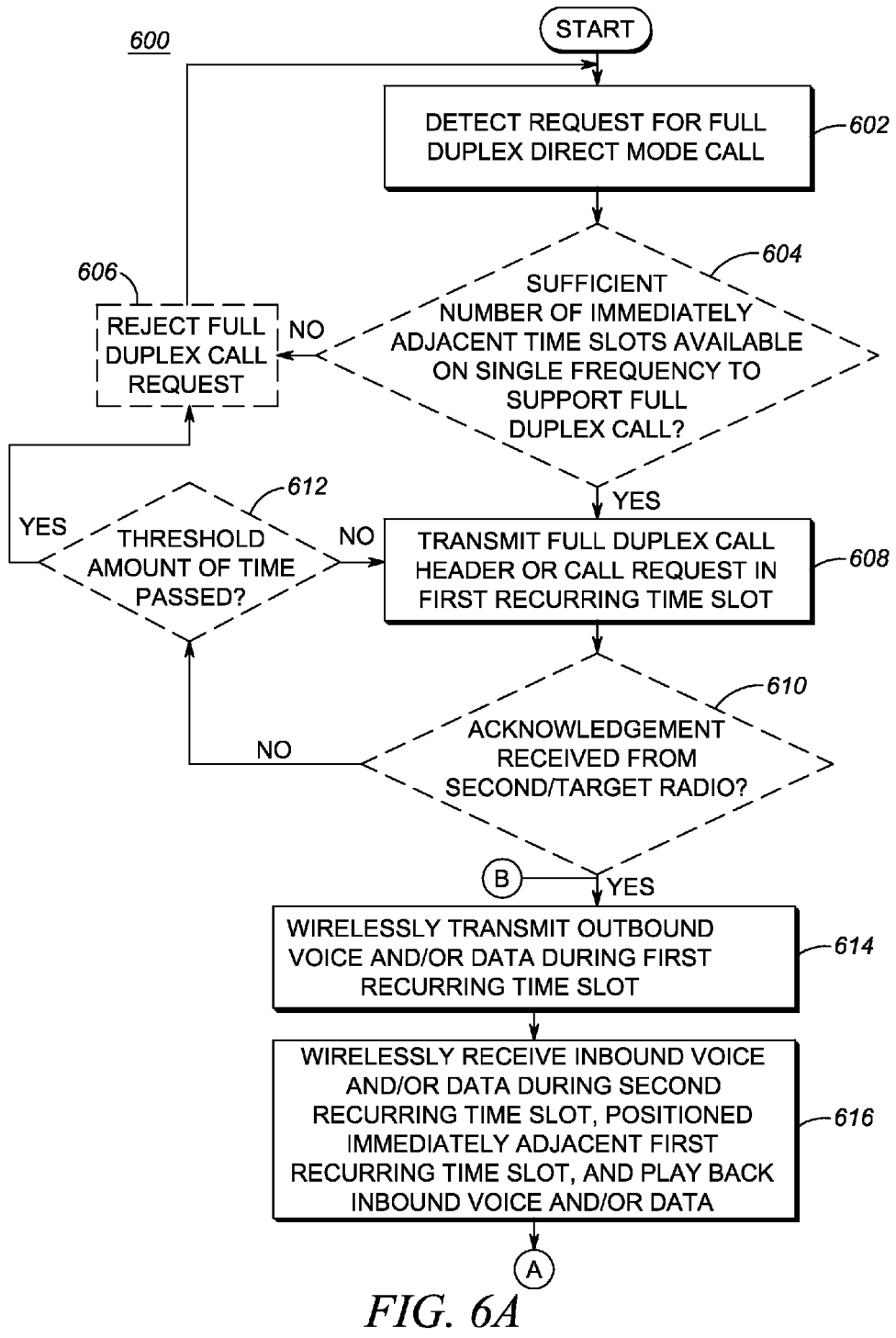
FIGS. 6A and 6B include a flow diagram illustrating a process for initiating and conducting a full duplex direct mode group or individual call in accordance with an embodiment.
Figure 6B:
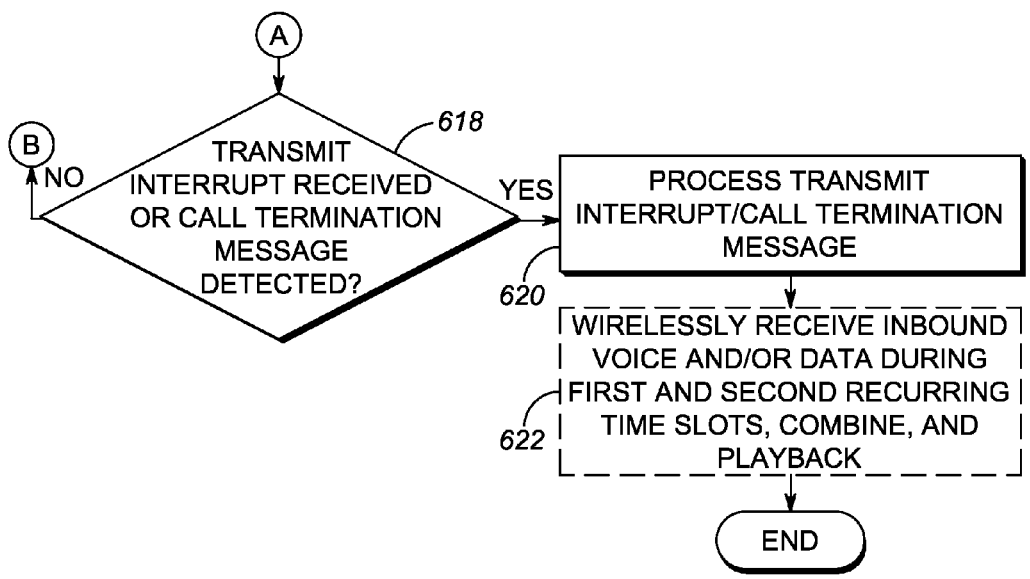

FIGS. 6A and 6B include a flow diagram illustrating a process 600 for initiating and conducting a full duplex direct mode call, executable at a full duplex direct mode capable radio, such as radio 300, in accordance with an embodiment. At step 602 in FIG. 6A, the radio detects a request for a full duplex direct mode call. Responsive to detecting the request, the radio determines at optional step 604 whether a sufficient number of immediately adjacent time slots are available on a single frequency to support the requested full duplex call. For example, in a system consistent with the ETSI-DMR 6.25e standard described above, the radio would determine whether both first and second recurring and immediately adjacent time slots on a single frequency are currently available (no carrier detected) for a full duplex direct mode individual call. For other TDMA protocols having varying N:1 slotting ratios and for call requests indicating more than one target device to actively participate in the call (such as group calls), the radio may alternatively determine whether N number of immediately adjacent (contiguous) timeslots are available to support the call request.

If the radio determines that there are an insufficient number of available timeslots to support the call request, processing proceeds to step 606, where the request is rejected by the calling radio, perhaps including a display or audible playback of an error message indicating the lack of sufficient RF resources for the full duplex call (and perhaps providing the user with the option of conducting a half duplex call instead, assuming sufficient resources are available).

If, on the other hand, the radio determines that there are a sufficient number of available timeslots to support the call request, processing proceeds from optional step 604 to step 608, where the radio transmits one of a full duplex call header (for a full duplex direct mode group call) and a full duplex call request (for a full duplex direct mode individual call) in a first number of available recurring time slots available on a single assigned frequency. In some embodiments, the radio may not check if a sufficient number of immediately adjacent timeslots are available before transmitting the call header or request at step 608, but instead, but only check if a single timeslot is available and begin transmitting the call header or request in each recurring first timeslot to act as a 'reservation' of the frequency for the full duplex call, and may then check for and wait for, if necessary, any remaining ongoing calls also on the same frequency to complete before beginning transmitting the requested full duplex direct mode group or individual call.

In an embodiment in which a full duplex direct mode individual call request is transmitted at step 608, and after transmitting at least a first call request in the first recurring time slot at step 608, the radio may, at step 610, optionally determine whether an acknowledgment to the request has been received in a second recurring timeslot immediately adjacent the first recurring timeslot. If no such acknowledgment has been received yet, processing continues to optional step 612, where the radio determines whether a threshold amount of time (or # of time slots) has passed since sending out the first call request. If the threshold amount of time (or # of time slots) has not passed, processing proceeds back to step 608, where another full duplex direct mode individual call request is transmitted in the next first recurring timeslot. If, however, the radio determines at optional step 612 that the threshold amount of time (or # of time slots) has passed, processing proceeds to step 606, where the call is rejected. For example, the threshold amount of time could be in the range of 1 to 10 seconds, including but not limited to 5 seconds.

Returning to optional step 610, if the radio determines that an acknowledgment has been received from the second/target radio (or in those cases where optional step 610 is not implemented, such as in group call modes), processing proceeds to step 614, where the radio begins wirelessly transmitting outbound payload traffic (voice and/or data) during first recurring time slots on the single frequency. In an immediately adjacent time slot, and at step 616, the radio wirelessly receives inbound voice and/or data during a second recurring time slot on the single frequency, positioned immediately adjacent the first recurring time slot, and plays back the inbound voice and/or data. For an individual call, the inbound voice and/or data at step 616 originates from the second/target radio. For a group call, the inbound voice and/or data at step 616 originates from a single subscribed member radio of the same talkgroup to which the radio transmitted to at step 614.

At step 618 in FIG. 6B, the radio determines whether a transmit interrupt message was transmitted by an inactive radio (e.g., another radio not participating in the full duplex call, but which may or may not be a member of the talkgroup) and was received during the prior first or second recurring time slots or whether a call termination message was detected (e.g., generated internally or received from some external device such as perhaps a Bluetooth headset) at the radio during the prior first or second recurring time slots (e.g., during steps 614 and/or 616). While FIGS. 6A and 6B illustrate steps 618 and 620 being executed after 616, in other embodiments, steps 618 and 620 may also or instead be executed after step 614.

If the radio determines that no transmit interrupt or call termination message is received or detected at step 618, processing returns back to step 614 of FIG. 6A to transmit the next voice and/or data generated at the radio in the next first recurring time slot. If, on the other hand, the radio determines at step 618 that a transmit interrupt or call termination message has been received or detected, processing proceeds to step 620, where the transmit interrupt or call termination message is processed.

The action taken by the radio at step 620 depends on whether a transmit interrupt or call termination message has been received or detected, and if a transmit interrupt has been received, on the contents of the received transmit interrupt message.

In one example, the radio may internally generate (or detect) a call termination message in response to a user releasing a PTT button (on the device itself or some wirelessly linked device such as a Bluetooth headset), indicating the user's desire to end their participation in the full duplex call. The radio then processes the internally generated (or externally generated but internally detected) call termination message at step 620, and transmits an over-the-air call termination message, such as that illustrated in FIG. 5 as being transmitted by radio 1 502 in TS1 slot 520, indicating and informing other radios of the radio's transition from an active status to an inactive status, and signaling that another currently inactive radio may transition to active status and begin transmitting to the talkgroup in the first recurring time slot previously used by the radio.

In a particular example where the radio was participating in a full duplex direct mode group call and terminates its participation (e.g., transitions to inactive status), another radio member of the talkgroup may key up and assume active status during the first recurring time slot. In this instance, and as reflected in optional step 622 in FIG. 6, the radio may subsequently begin receiving first and second inbound voice and/or data during subsequent first and second recurring time slots. The radio may then combine the first and second inbound voice and/or data and playback the combined voice and/or data while in inactive status.

In another example, the radio may receive a transmit interrupt message from either a random radio (either a member of the same talkgroup as the radio or not) that wishes to tear down both slots, or perhaps a (currently inactive) talkgroup member wishing to tear down only a single slot of the group call to allow it to obtain active status in the group call (at the expense of another currently active status member, such as the radio). A transmit interrupt message is a message that may be transmitted during a particular payload burst (e.g., during payload slot F in time slot 530 in FIG. 5 for example) that is periodically, and on a regular pre-configured schedule, dropped by the transmitting radio to allow the transmit interrupt message to be transmitted in place of the dropped payload burst. A transmitting radio transitions to receive mode during the dropped burst so that it can detect a transmitted transmit interrupt message (for example, instead of transmitting a payload burst at a particular execution of step 614 corresponding to payload F, instead transitioning to a receive mode). The transmit interrupt message may be, for example, a CSBK with a particular bit setting or opcode to identify itself as a transmit interrupt message and to indicate whether the voice and/or data only on the recurring timeslot on which it is transmitted should be torn down (halted), or whether the voice and/or data on both (or all) timeslots of the full duplex call should be torn down.

If the radio determines that it is transmitting in a same recurring timeslot on which the transmit interrupt message is transmitted, the radio halts any pending or further transmissions on subsequent recurring timeslots (e.g., first recurring time slots in this case). If the radio determines that it is transmitting in a different recurring timeslot than that on which the transmit interrupt message is transmitted (e.g., the transmit interrupt message is received during a second recurring time slot), but the transmit interrupt message indicates that both recurring timeslots should be torn down, the radio also halts any pending or further transmissions on subsequent recurring timeslots.

Otherwise, if the radio determines that it is transmitting in a different recurring timeslot than that on which the transmit interrupt message is transmitted (e.g., the transmit interrupt message is received during a second recurring time slot), and the transmit interrupt message indicates that only the time slot in which it was transmitted should be torn down, the radio continues transmitting outbound audio and/or data on its assigned (first) recurring time slot.

III. CONCLUSION

Advantageously, by providing full duplex voice and/or data communications services in an N:1 TDMA direct mode communications system that does not require each radio to switch its synthesizer between a transmit frequency and a different receive frequency, and vice versa, within an amount of time between adjacent slots in the N:1 TDMA direct mode protocol, improved direct mode communications service may be provided at reduced costs and complexity. Other advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling full duplex calls in a direct mode between radios in an N:1 slotting ratio time division multiple access (TDMA) radio system, the method comprising:
   detecting, at a first radio, a request for a full duplex direct mode call from the first radio to at least a second radio;
   wirelessly transmitting, in a particular slot of a first recurring time slot of N recurring time slots on a first single frequency, one of a call request and a call header identifying the call as a full duplex call;
   wirelessly transmitting, by the first radio, during a plurality of subsequent first recurring time slots, outbound voice and/or data transmissions; and
   wirelessly receiving, at the first radio, during a plurality of second recurring time slots of the N recurring time slots on the first single frequency, each second recurring timeslot positioned immediately adjacent a respective first recurring time slot in an interleaved manner, inbound voice and/or data transmissions from the second radio and playing back the inbound voice and/or data transmission at the first radio; and
   wherein the direct mode of the full duplex direct mode call is a mode of operation where the first and second radios communicate directly with each other using the first single frequency without the use of any or all external infrastructure equipment.

2. The method of claim 1, further comprising determining, by the first radio and prior to transmitting the call request, that the first and second recurring timeslots are available on the first single frequency for the full duplex call.

3. The method of claim 1, wherein:
the full duplex call request is an individual call;
the step of transmitting comprises repeatedly transmitting the call request in first recurring time slots until a response is received from the second radio acknowledging the request, so as to reserve both the first and second recurring time slots until the response is received;
and wherein the response is received from the second radio during the second recurring time slot prior to receiving the inbound voice and/or data transmissions during the second recurring time slot.

4. The method of claim 1, wherein the one of the call request and the call header explicitly identifies the first and second recurring time slots via a one or more bit settings within the one of the call request and the call header.

5. The method of claim 1, wherein the one of the call request and the call header implicitly identifies the first and second recurring time slots based solely on its transmission on the first recurring time slot.

6. The method of claim 1, wherein the request indicates that it is a full duplex group call and the step of wirelessly transmitting one of a call request and a call header comprises broadcasting the call header, the call header including a group identifier identifying a target group for the full duplex group call.

7. The method of claim 6, further comprising responsive to determining to terminate the first radio's transmission in the full duplex group call:
transmitting, by the first radio, a termination message during a second particular slot of the first recurring time slot indicating the first radio's transition to an inactive status;
subsequently receiving, in the first recurring time slot, second inbound voice and/or data transmissions from a third radio; and
combining and simultaneously playing back the first inbound voice and/or data transmissions from the second radio and the second inbound voice and/or data transmission from the third radio.

8. The method of claim 7, further comprising, responsive to detecting, at the first radio, a second request to transmit in the full duplex direct mode call:
detecting whether one of the first recurring time slot and the second recurring time slot is available to transmit in; and
responsive to detecting active transmissions in the first and second recurring time slots, denying the second request.

9. The method of claim 7, wherein the request is a full duplex direct mode group call request, the method further comprising, responsive to detecting, at the first radio, a second request to transmit in the full duplex direct mode call:
detecting whether one of the first recurring time slot and the second recurring time slot is available to transmit in; and
responsive to failing to detect any active transmissions in the second recurring time slot:
wirelessly transmitting, by the first radio, during the second recurring time slot, second outbound voice and/or data transmissions; and
wirelessly receiving, at the first radio, during the first recurring time slot, second inbound voice and/or data transmissions from the third radio and playing back the second inbound voice and/or data transmission at the first radio.

10. The method of claim 1, wherein N is 2.

11. The method of claim 1, further comprising:
wirelessly receiving, at the first radio, during a particular one of a third recurring time slot of the N recurring time slots, each third recurring timeslot positioned immediately adjacent the second recurring time slot and the first recurring timeslot in an interleaved manner, second inbound voice and/or data transmissions from a third radio; and
combining and simultaneously playing back the first inbound voice and/or data transmissions from the second radio and the second inbound voice and/or data transmission from the third radio.

12. The method of claim 1, further comprising receiving a transmit interrupt message during the second recurring time slot, determining, by the contents of the interrupt message, whether the transmit interrupt message requests tear down of only the second recurring time slot or the entire full duplex call, and responsive to determining that the transmit interrupt message requests tear down of the entire full duplex call, refraining from further transmitting during the first recurring time slot and ending the call.

13. The method of claim 1, wherein detecting, at a first radio, a request for a full duplex direct mode call from the first radio to at least a second radio, further comprises:
detecting push-to-talk (PTT) button press at the first radio.

14. A radio capable of communicating in a full duplex call in a direct mode between one or more other radios in an N:1 slotting ratio time division multiple access (TDMA) radio system, the radio comprising:
a transceiver;
a memory; and
a processor configured to:
detect a request for a full duplex direct mode call from the radio to at least a second radio;
wirelessly transmit, via the transceiver, in a particular slot of a first recurring time slot of N recurring time slots on a first single frequency, one of a call request and a call header identifying the call as a full duplex call;
wirelessly transmit, via the transceiver, during a plurality of subsequent first recurring time slots, outbound voice and/or data transmissions;
wirelessly receive, via the transceiver, during a plurality of second recurring time slots of the N recurring time slots of the first single frequency, each second recurring timeslot positioned immediately adjacent a respective first recurring time slot in an interleaved manner, inbound voice and/or data transmissions from the second radio; and
play back the inbound voice and/or data transmission; and
wherein the direct mode of the full duplex direct mode call is a mode of operation where the first and second radios communicate directly with each other using the first single frequency and without the use of any or all external infrastructure equipment.

15. The radio of claim 14, wherein the processor is further configured to determine, via the transceiver and prior to transmitting the call request, that the first and second recurring timeslots are available on the first single frequency for the full duplex call.

16. The radio of claim 14, wherein:

the full duplex call request is an individual call;

the processor is further configured to repeatedly transmit the call request, via the transceiver, in first recurring time slots until a response is received from the second radio acknowledging the request, so as to reserve both the first and second recurring time slots until the response is received;

and the processor is further configured to receive, via the transceiver and from the second radio, the response during the second recurring time slot prior to receiving the inbound voice and/or data transmissions during the second recurring time slot.

17. The radio of claim 14, wherein the one of the call request and the call header explicitly identifies the first and second recurring time slots via a one or more bit settings within the one of the call request and the call header.

18. The radio of claim 14, wherein the one of the call request and the call header implicitly identifies the first and second recurring time slots based solely on its transmission on the first recurring time slot.

19. The radio of claim 14, wherein the request indicates that it is a full duplex group call and the processor is further configured to broadcast, via the transceiver, the call header, the call header including a group identifier identifying a target group for the full duplex group call.

20. The radio of claim 14, wherein N is 2.

21. The radio of claim 14, wherein the processor is further configured to receive, via the transceiver, a transmit interrupt message during the second recurring time slot, and responsively determine, by the contents of the interrupt message, whether the transmit interrupt message requests tear down of only the second recurring time slot or the entire full duplex call, and responsive to determining that the transmit interrupt message requests tear down of the entire full duplex call, refraining from further transmitting during the first recurring time slot and ending the call.

* * * * *